US012350688B2

(12) United States Patent
Miller et al.

(10) Patent No.: US 12,350,688 B2
(45) Date of Patent: Jul. 8, 2025

(54) METHOD OF INDUSTRIAL CENTRIFUGE BASKET PERFORATION

(71) Applicant: The Western States Machine Company, Fairfield, OH (US)

(72) Inventors: John Miller, Hamilton, OH (US); Gregory Allgaier, Monroe, OH (US); William Temple, Brookville, IN (US)

(73) Assignee: The Western States Machine Company, Fairfield, OH (US)

( * ) Notice: Subject to any disclaimer, the term of this patent is extended or adjusted under 35 U.S.C. 154(b) by 925 days.

(21) Appl. No.: 17/181,221

(22) Filed: Feb. 22, 2021

(65) Prior Publication Data

US 2021/0276025 A1 Sep. 9, 2021

Related U.S. Application Data

(60) Provisional application No. 62/986,240, filed on Mar. 6, 2020.

(51) Int. Cl.
*B04B 7/18* (2006.01)
*B21D 51/02* (2006.01)

(52) U.S. Cl.
CPC ................ *B04B 7/18* (2013.01); *B21D 51/02* (2013.01)

(58) Field of Classification Search
CPC ............ B04B 7/18; B21D 51/02; B21D 51/16
See application file for complete search history.

(56) References Cited

U.S. PATENT DOCUMENTS 1,885,873 A * 11/1932 Stein ..................... A47J 19/005 241/84.4
2,145,633 A 1/1939 Roberts
4,229,298 A 10/1980 Bange
5,254,241 A 10/1993 Bange et al.
5,897,786 A 4/1999 Henkel et al.
(Continued)

FOREIGN PATENT DOCUMENTS

NZ 542064 A * 10/2006 ................ B26F 1/08

OTHER PUBLICATIONS

Heston, Tim; A Plate Rolling Primer; The Fabricator.com; Oct. 12, 2012; 11 pgs.; (last accessed Mar. 7, 2022).
(Continued)

*Primary Examiner* — Hayden Brewster
(74) *Attorney, Agent, or Firm* — Dinsmore & Shohl LLP

(57) ABSTRACT

A method for making a cylindrical centrifuge basket according to the present disclosure includes pre-perforating a metal sheet to form a perforated metal sheet having perforations aligned along rows extending across a width of the perforated metal sheet. Each row is skewed at a prescribed nonzero skew angle relative to a surface line on the perforated metal sheet, the surface line parallel to an axis of rotation of the cylindrical centrifuge basket. The method further includes roller forming the perforated metal sheet to produce a perforated basket wall sheet, coupling a first edge of the perforated basket wall sheet to a second edge of the perforated basket wall sheet to form a cylindrical basket wall, and coupling a first end of the cylindrical basket wall to a ring, coupling a second end of the cylindrical basket wall to a baseplate, or both to form the cylindrical centrifuge basket.

18 Claims, 11 Drawing Sheets

(56) References Cited

U.S. PATENT DOCUMENTS

| | | | | |
|---|---|---|---|---|
| 8,182,409 | B2 | 5/2012 | Hoffmann | |
| 2021/0260503 | A1* | 8/2021 | Colgrove ............. | B01D 29/902 |

OTHER PUBLICATIONS www.machinemfg.com; 3 Roll Bending Machine (Working Principle and Rolling Process); https://www.machinemfg.com/3-roll-bending-machine-working-principle-rolling-process/; not dated, 20 pgs.; (last accessed Mar. 7, 2022).

* cited by examiner

METHOD OF INDUSTRIAL CENTRIFUGE BASKET PERFORATION

CROSS-REFERENCE TO RELATED APPLICATIONS

This application claims the benefit of priority under 35 U.S.C. § 120 of U.S. Provisional Application No. 62/986,240, entitled "Method of Industrial Centrifuge Basket Perforation," filed Mar. 6, 2020, the entire contents of which are incorporated by reference in this disclosure.

TECHNICAL FIELD

The present disclosure is directed to industrial centrifuges, in particular, to cylindrical centrifuge baskets for industrial centrifuges and methods of making the cylindrical centrifuge baskets.

BACKGROUND

Industrial centrifuges are regularly used to extract one or more chemical from a mixture of botanical (plant) matter. A common example is the extraction of sucrose sugar crystals from a processed mixture of sugarcane or sugarbeet biomass, called massecuite. In another botanical product extraction application, an industrial centrifuge can be used in a cold chemical extraction of CBD (cannabidiol) oil from biomass comprising industrial hemp or certain low-THC strains of marijuana. The extraction fluid carrying the CBD oil is forced out through the perforated holes in the basket sidewall of the spinning centrifuge basket by centrifugal forces that can be several hundred times the force of gravity.

SUMMARY

Centrifuge baskets for industrial centrifuges can be made by roll forming a solid metal sheet into a metal cylinder, which is then coupled to a ring at one end and a baseplate at the other end to form a solid centrifuge basket. The cylindrical sidewall of the solid centrifuge basket is then perforated to produce the perforated centrifuge basket. However, forming perforations in a cylindrical sidewall is difficult and time consuming, which can increase the costs and cycle times needed to manufacture the centrifuge baskets. In another technique, the solid metal sheet can be pre-perforated when flat and then roll-formed to produce a perforated cylindrical sidewall of the centrifuge basket. However, the perforations in the solid sheet can produce localized weak spots in the perforated metal sheet. These localized week spots can buckle during roll forming to cause faceting and scalloping of the cylindrical sidewall of the centrifuge basket, which can impact the ability to rotationally balance the centrifuge basket. Improper balancing can cause premature wear and failure of the industrial centrifuge.

Accordingly, there is an ongoing need for methods for producing cylindrical centrifuge baskets for industrial centrifuges to improve the efficiency of manufacturing while maintaining the quality of the cylindrical centrifuge baskets. This disclosure relates to methods for the design and fabrication of a cylindrical centrifuge basket for an industrial centrifuge. In particular, the methods of the present disclosure include pre-perforating a solid metal sheet according to a skewed hole pattern in which the rows of perforations are aligned along a line forming a non-zero skew angle with a line of the surface of the solid metal sheet that would be parallel with the axis of rotation (center axis) of the cylindrical centrifuge basket once completed. The perforation pattern comprising a skewed hole pattern may reduce localized weak spots, which may reduce or prevent faceting or scalloping during roll-forming. Pre-perforating the metal sheet prior to roll-forming may increase the efficiency of producing the cylindrical centrifuge baskets. Other features and advantages of the methods of the present disclosure may become apparent through practice of the disclosed methods.

According to one or more aspects of the present disclosure, a method for manufacturing a cylindrical centrifuge basket may include perforating a metal sheet to form a perforated metal sheet having a plurality of perforations aligned along rows extending across a width of the perforated flat metal sheet. Each row may be skewed at a nonzero skew angle relative to a surface line on the perforated metal sheet, where the surface line is parallel to an axis of rotation of the cylindrical centrifuge basket. The method may further include, after perforating the metal sheet to form the perforated metal sheet, roller forming the perforated metal sheet to produce a perforated basket wall sheet, coupling a first edge of the perforated basket wall sheet to a second edge of the perforated basket wall sheet to form a cylindrical basket wall, and coupling a first end of the cylindrical basket wall to a ring, coupling a second end of the cylindrical basket wall to a baseplate, or both to form the cylindrical centrifuge basket.

According to one or more other aspects of the present disclosure, a method of forming a cylindrical basket wall for a cylindrical centrifuge basket may include forming a plurality of perforations in a metal sheet having a longitudinal dimension Y, a first longitudinal end, a second longitudinal end, and a transverse dimension X to produce a perforated metal sheet. The plurality of perforations may be arranged in a plurality of rows spaced apart along the longitudinal dimension Y, each row forming a perforation hole line. Each perforation hole line may form a non-zero skew angle relative to the transverse dimension X of the metal sheet. The method may further include, after forming the plurality of perforations, roller forming the perforated metal sheet to form a perforated basket wall sheet having a circular cross-sectional shape and a center axis wherein the center axis of the perforated basket wall sheet is parallel to the transverse dimension X of the metal sheet. The method may further include coupling the first longitudinal end to the second longitudinal end to form the cylindrical basket wall.

According to one or more other aspects of the present disclosure, a cylindrical basket wall for a cylindrical centrifuge basket made by any of the methods herein is disclosed. The cylindrical basket wall may comprise a plurality of perforations on the cylindrical basket wall, the cylindrical basket wall having on the cylinder surface a dimension X parallel to the cylindrical axis and an orthogonal circumference dimension U. The plurality of perforations may be arranged in a plurality of rows spaced apart along the orthogonal circumference dimension U, each row forming a perforation hole line having a non-zero skew angle $\Theta$ relative to a line on the surface the cylindrical basket wall parallel to the dimension X. The surface of the cylindrical basket wall may be divided into a plurality of N adjacent bands in the orthogonal circumference dimension U around the cylindrical basket wall, where N is an integer. Each of the plurality of adjacent bands may have a band length AU equal to or less than the maximum dimension of the perforations in the orthogonal circumference dimension U, a band width equal to the height H of the cylindrical basket wall in the dimension X, a total band surface area equal to $H\times\Delta U$, and a lost metal area B representing the area lost due to perforations present in the band. The Variance (B, Θ) in the lost metal area B over the N number of adjacent bands for the perforated cylinder having the non-zero skew angle Θ may be less than 20 percent of the Variance (B, 0°) in the lost metal area B over the N number of adjacent bands for a comparable perforated cylinder having a skew angle equal to 0°, where the Variance (B, Θ) function is the statistical variance function of B over the N bands on the surface of the cylinder.

BRIEF DESCRIPTION OF THE FIGURES

The following detailed description of specific embodiments of the present disclosure can be best understood when read in conjunction with the following drawings, where like structure is indicated with like reference numerals and in which.

DETAILED DESCRIPTION

Figure 1:
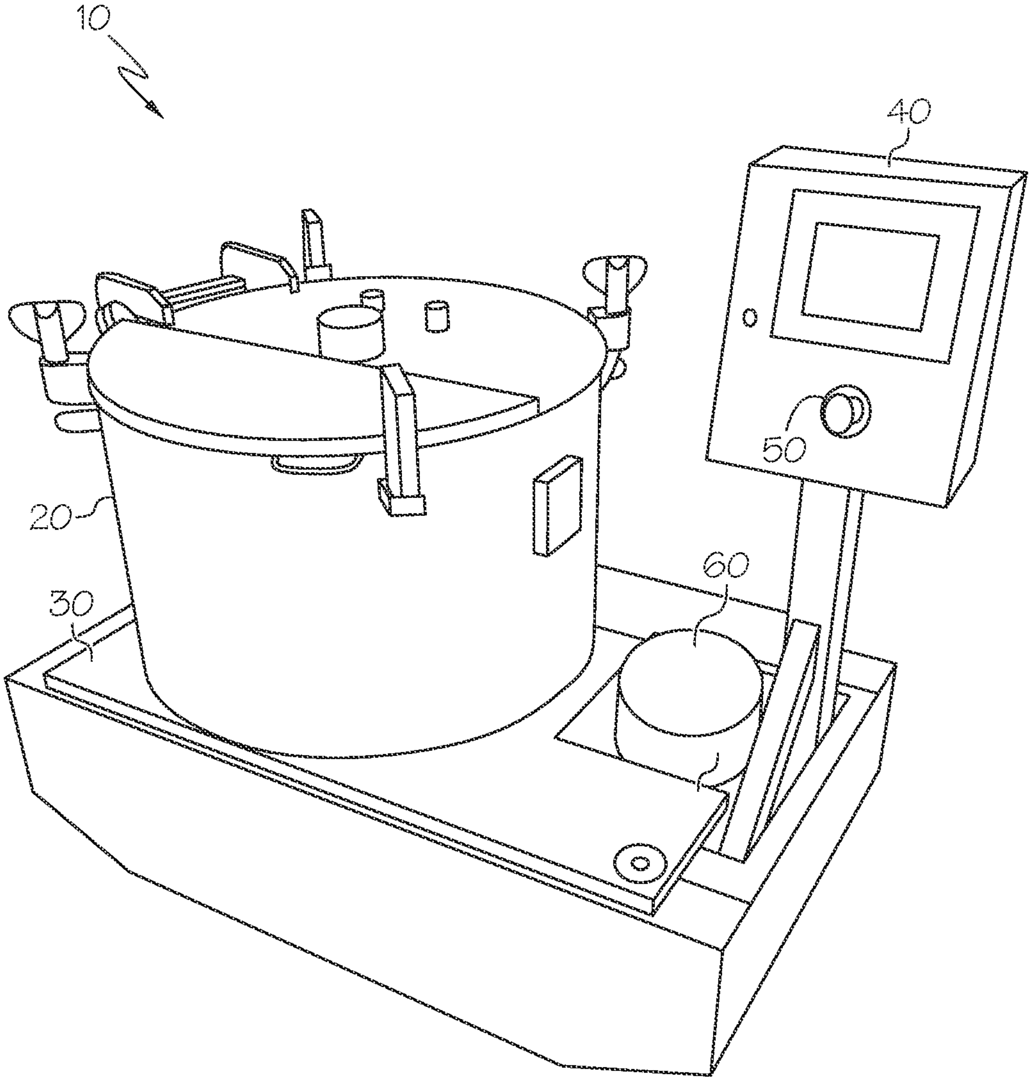
FIG. 1 schematically depicts a front perspective view of an industrial centrifuge, according to one or more embodiments shown and described herein.

Many industrial centrifuges use a perforated cylindrical separation basket, which can be formed by welding a roll-formed solid cylindrical basket wall sheet to the edges of a reinforcing ring at the top and disk-shaped baseplate at the bottom. The bottom disk-shaped baseplate comprises the basket floor and provides an attachment to the motor drive spindle. In conventional methods of producing a cylindrical centrifuge basket, the cylindrical basket wall is perforated after assembly of the cylindrical centrifuge basket, such as after roll-forming and attaching the reinforcing ring and disk-shaped baseplate. Conventional perforation designs place the lines of perforation holes in rows parallel to the rotational axis of the cylindrical centrifuge basket (e.g., the center axis of the cylindrical centrifuge basket). Pre-perforating a rectilinear hole pattern on the flat metal sheet prior to roll-forming can result in repetitive (regular and recurring) regions of sheet weakness which could cause a pre-perforated sheet to buckle and fold along these lines during roll-forming. The resulting output from the roll-forming process would be a perforated cylinder having a faceted polygon cross-sectional shape rather than a circular cross-sectional shape, which may make it more difficult to dynamically balance the cylindrical centrifuge basket.

The methods of the present disclosure are directed to methods of producing cylindrical centrifuge baskets by pre-perforating a metal sheet according to a hole pattern designed so that the perforation holes are in rows aligned along perforation hole lines that form non-zero skew angles with a line on the surface of the cylindrical basket wall parallel to the center axis of the cylindrical centrifuge basket. In particular, the methods of the present disclosure may include perforating a metal sheet to form a perforated metal sheet having a plurality of perforations aligned along rows extending across a width of the perforated flat metal sheet. Each row may be skewed at a nonzero skew angle relative to a surface line on the perforated metal sheet, where the surface line is parallel to an axis of rotation of the cylindrical centrifuge basket. The method may further include, after perforating the metal sheet to form the perforated metal sheet, roller forming the perforated metal sheet to produce a perforated basket wall sheet, coupling a first edge of the perforated basket wall sheet to a second edge of the perforated basket wall sheet to form a cylindrical basket wall, and coupling a first end of the cylindrical basket wall to a ring, coupling a second end of the cylindrical basket wall to a baseplate, or both to form the cylindrical centrifuge basket. The methods of the present disclosure may enable the metal sheet to be more efficiently pre-perforated and then roll-formed into a cylinder while avoiding faceting or scalloping. Thus, the methods of the present disclosure may improve the manufacturing time and cost of the cylindrical centrifuge baskets with little or no changes in cylindrical centrifuge basket quality or performance.

Figure 2:
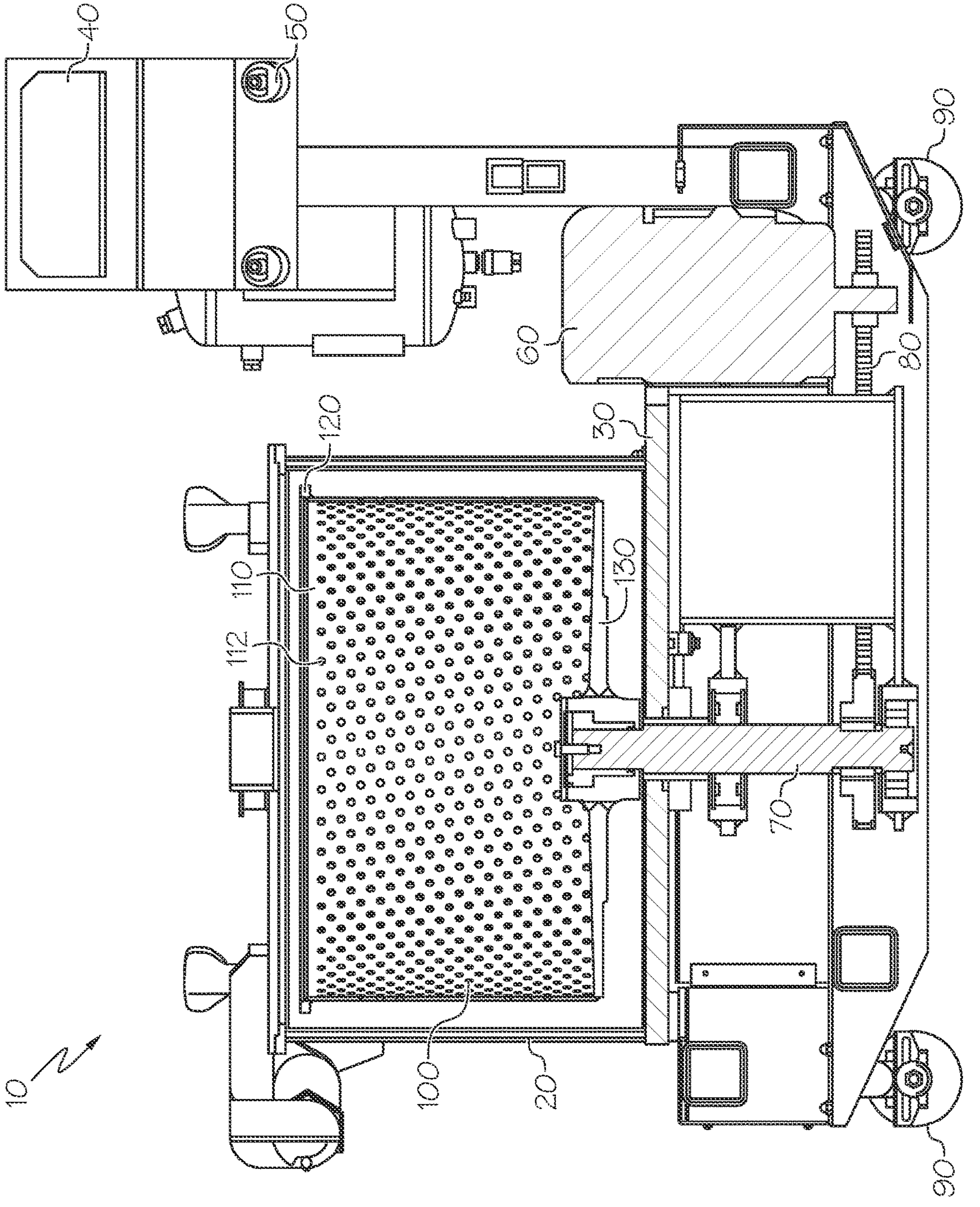
FIG. 2 schematically depicts a front cross-sectional view of the industrial centrifuge shown in FIG. 1, according to one or more embodiments shown and described herein.

Referring now to FIGS. 1 and 2, an industrial centrifuge 10 of the present disclosure is schematically depicted. The industrial centrifuge 10 includes a curb 20 attached to and supported by a raised machine floor 30. The curb 20 refers to the cylindrical outer housing of the industrial centrifuge 10. Inside the curb 20 is a rotating cylindrical centrifuge basket 100 (FIG. 2), in which the chemical extraction from the rotating biomass takes place. The centrifuge 10 is driven by an electric motor 60 disposed below the raised machine floor 30. The control panel 40 for operation of the centrifuge 10 and emergency stop button 50 are at the upper right and are operatively coupled to the industrial centrifuge 10. An example of the industrial centrifuge 10 may be a Western States Machine Company model C40 botanical extraction centrifuge 10 designed and manufactured for OEM sale, although the industrial centrifuge 10 is not intended to be limited thereto.

Figure 3:
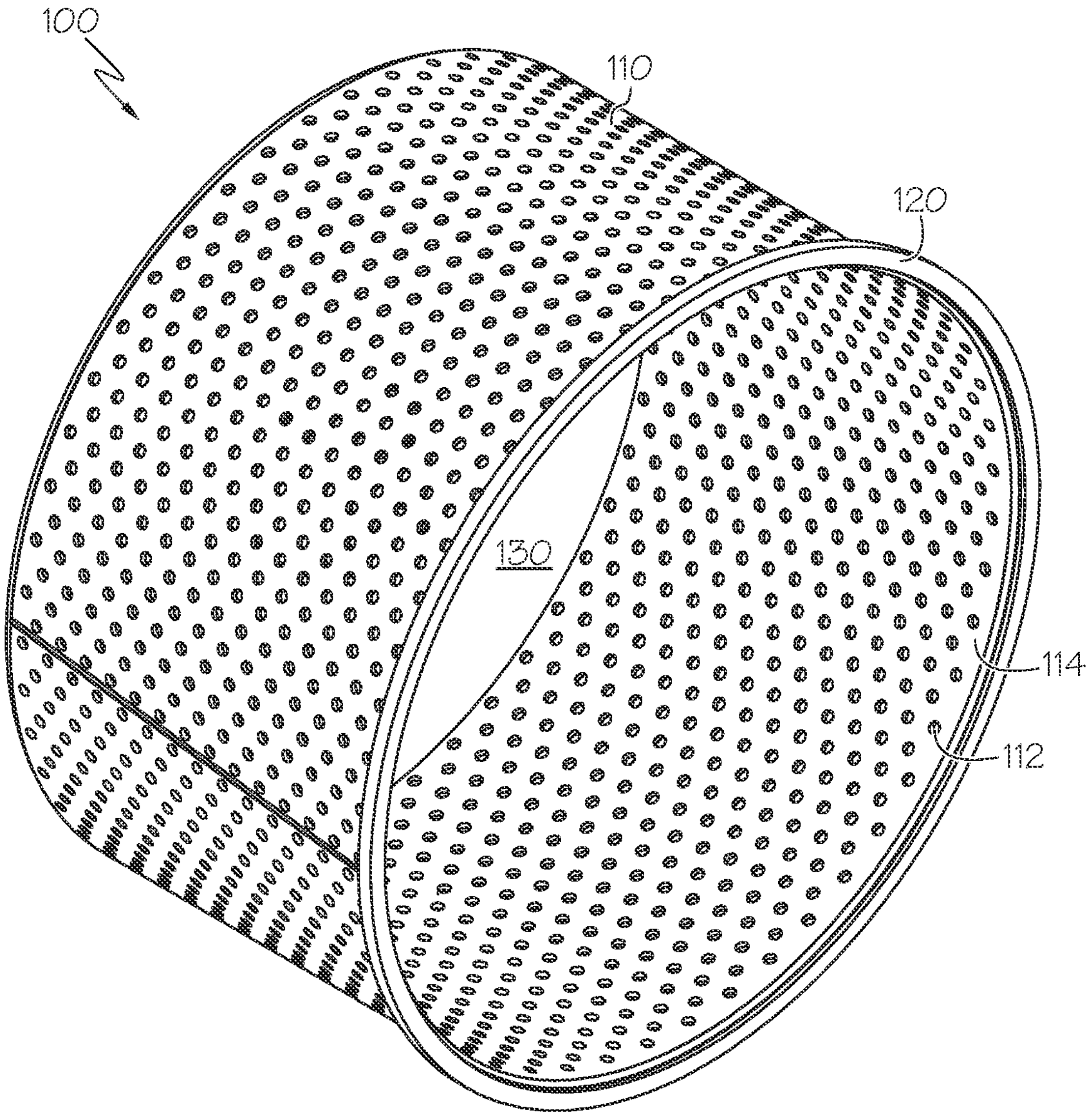
FIG. 3 shows a top perspective view of a cylindrical centrifuge basket used in the industrial centrifuge of FIGS. 1 and 2 and in which the separation takes place, according to one or more embodiments shown and described herein.

FIG. 2 shows a schematic cross-section of the industrial centrifuge 10 shown in FIG. 1. The cylindrical centrifuge basket 100 may be attached to and supported on a rotating spindle 70, which can be driven by a timing belt 80 operatively connected to electric motor 60. Locking wheels 90 may enable movement of the industrial centrifuge 10 to multiple locations of use. The cylindrical centrifuge basket 100 may include a cylindrical basket wall 110 coupled at one end to the reinforcing ring 120 and at the other end to the disk-shaped baseplate 130. The cylindrical basket wall 110 has a circular cross section. The cross-sectional shape of the cylindrical basket wall 110 is not faceted or polygonal. Referring to FIG. 3, in embodiments, no portion of an inner surface 114 of the cylindrical basket wall 110 is flat. In embodiments, no portion of the inner surface 114 of the cylindrical basket wall 110 has a radius of curvature that differs by more than 2% from a mean radius of curvature from the axis of rotation A (FIG. 4, i.e., center axis) of the cylindrical centrifuge basket 100 to the inner surface 114 of the cylindrical basket wall 110.

Referring again to FIG. 2, the cylindrical basket wall 110 may include a plurality of perforation holes 112, which are openings extending all the way through the cylindrical basket wall 110 to allow fluids to flow through the cylindrical basket wall 110 during operation of the industrial centrifuge 10. In embodiments, the cylindrical centrifuge basket 100 may include 96 rows of perforation holes, each row having 14 holes that are 0.375 inch in diameter. Adjacent rows may be interleaved as shown in FIG. 2. In embodiments, the cylindrical centrifuge basket 100 may have more or less than 96 rows of perforation holes, such as from 20 to 300 rows of perforation holes 112 depending on the size of the industrial centrifuge 10, the size of the perforation holes 112, or both. In embodiments, each row of perforation holes 112 may have more or less than 14 perforation holes 112, such as from 5 to 50 perforation holes 112, depending on the size of the industrial centrifuge 10, the size of the perforation holes 112, or both. The perforation holes 112 may be larger or smaller than 0.375 inches, such as from 0.0625 inches to 1 inch.

Referring again to FIG. 3, a perspective view of cylindrical centrifuge basket 100 is schematically depicted. By industrial centrifuge standards, the cylindrical centrifuge basket 100 depicted in FIG. 3 may be a small basket, being 26 inches in diameter by 15.4 inches high and with a capacity of 35 gallons. The cylindrical centrifuge basket 100 in FIG. 3 can hold a 40 lb. biomass load. However, the cylindrical centrifuge basket 100 is not limited thereto. It is understood that the cylindrical centrifuge basket 100 can have any length, diameter, and volume according to the end use of the industrial centrifuge 10. The cylindrical centrifuge basket 100 can have a volume of from 1 gallon to 500 gallons or even up to 1000 gallons, depending on the specific application.

Figure 4:
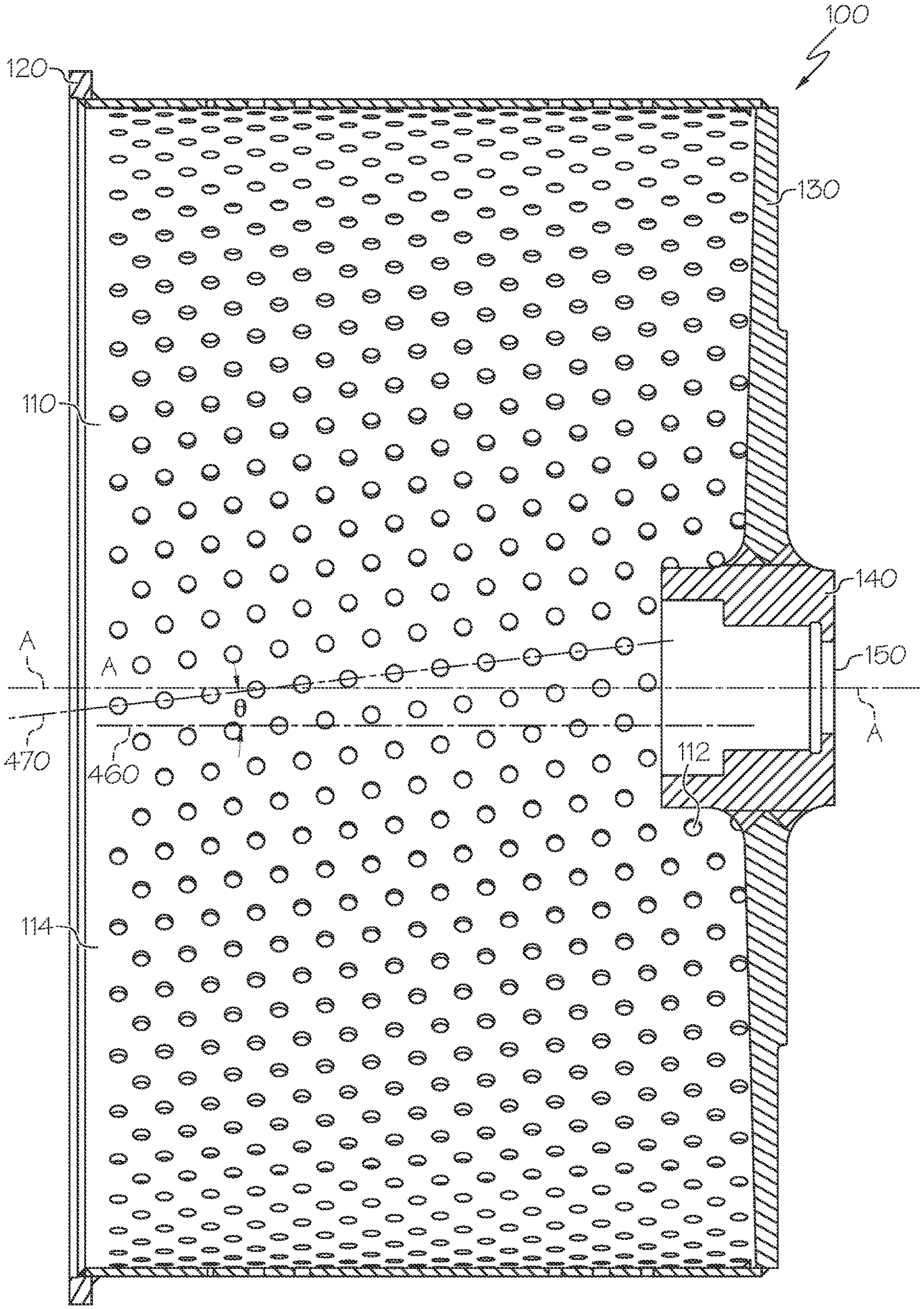
FIG. 4 schematically depicts a front cross-sectional view of the cylindrical centrifuge basket of FIG. 3 showing a pattern of perforation holes drilled in the cylindrical centrifuge basket for fluid extraction, according to one or more embodiments shown and described herein.

A cross-sectional view of the cylindrical centrifuge basket 100 is shown in FIG. 4. As previously discussed, the cylindrical basket wall 110 can be welded at a top end to the open ring 120 and at a bottom end to the disk-shaped baseplate 130. Baseplate 130 may include a hub 140 with a motor connection 150. The perforation holes 112 may be aligned in rows along a perforation hole line 470 that forms a non-zero skew angle θ (theta) with a line 460 on the surface of the cylindrical basket wall parallel to an axis of rotation A of the cylindrical centrifuge basket. The non-zero skew angle θ may be from 1 degree to 20 degrees, from 2 degrees to 12 degrees, or from 3 degrees to 8 degrees. In embodiments, the skew angle θ between the perforation hole line 470 and the line 460 on the surface of the cylindrical basket wall 110 parallel to the axis of rotation A of the cylindrical centrifuge basket 100 may be 5.7 degrees. The perforation holes 112 in each row of perforations of the cylindrical basket wall 110 may be evenly spaced apart from each other along the perforation hole line 470. The perforation hole lines 470 of the rows of perforation holes 112 may be parallel with each other. The rows of perforation holes 112 may arranged evenly around the cylindrical basket wall 110, such as being evenly spaced apart by an equal number of degrees between each row of perforation holes 112.

The cylindrical centrifuge basket 100 may spin at rotational speeds of approximately 1500 RPM or more, which may produce 900G or more of centrifugal force. Therefore, dynamic balancing of the empty cylindrical centrifuge basket 100 and balancing of the entire industrial centrifuge 10 can reduce or prevent vibrations which could damage the industrial centrifuge 10.

Figure 5A:
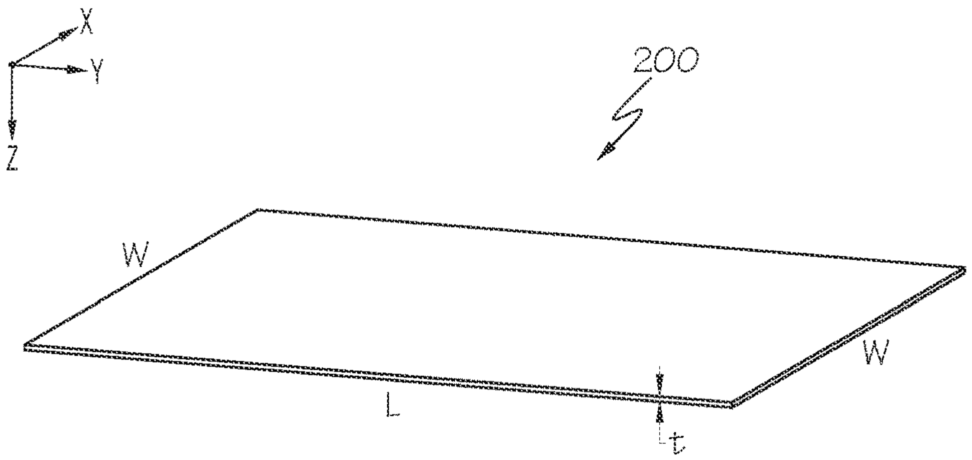
FIG. 5A schematically depicts a first step of a process for roll forming a basket wall sheet of a cylindrical centrifuge basket, according to one or more embodiments shown and described herein.
Figure 5B:
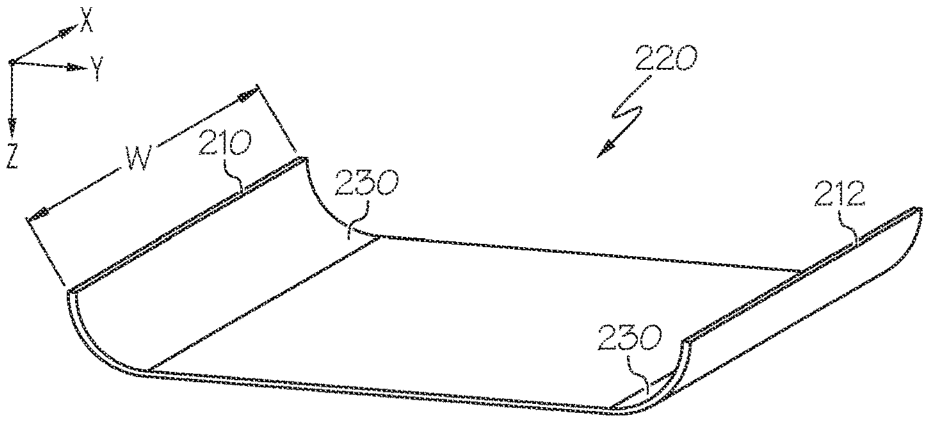
FIG. 5B schematically depicts a second step of a process for roll forming a basket wall sheet of a cylindrical centrifuge basket, according to one or more embodiments shown and described herein.
Figure 5C:
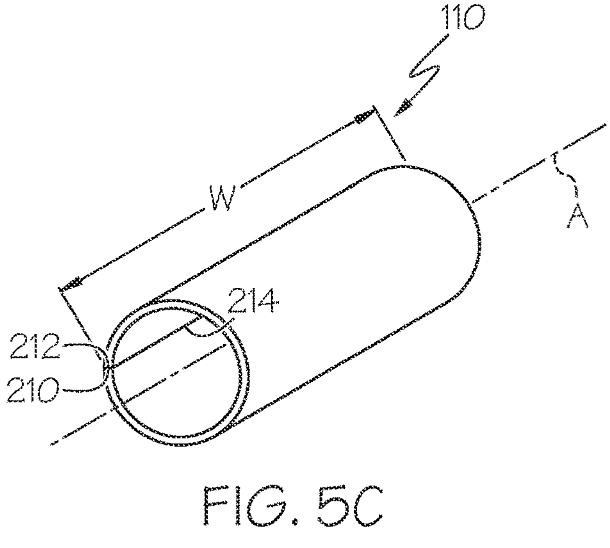
FIG. 5C schematically depicts a third step of a process for roll forming a basket wall sheet of a cylindrical centrifuge basket, according to one or more embodiments shown and described herein.

Referring now to FIGS. 5A, 5B, and 5C, process steps are shown for forming a cylindrical basket wall 110 by rolling a sheet 200 of metal into a cylinder of the desired radius and welding the ends at 210 to form the cylindrical basket wall 110. The sheet 200 may be a flat sheet. The sheet 200 may be pre-perforated or not perforated prior to rolling. The flat sheet 200 can be stainless steel or any other metal suitable for forming the cylindrical centrifuge basket 100.

For reference, coordinate axes X, Y, and Z are defined in FIG. 5A for sheet 200. In FIGS. 5A-5C, the Y-axis is parallel to the edge along the sheet 200 defining length L and is also the direction of material flow through the sheet bender (roll-forming machine). The X-axis is perpendicular to the Y-axis and is across the sheet width W. The X-axis will be parallel to the finished axis of the cylindrical basket wall 110 (e.g., the axis of rotation A of the cylindrical centrifuge basket 100 comprising the cylindrical basket wall 110). In FIGS. 5A-5C, the Z-axis is perpendicular to the X-axis and Y-axis and is measured through the sheet (e.g., extending perpendicular to the sheet 200 through the thickness t of the sheet 200).

As shown in FIG. 5B, the rolling process for a cylindrical basket wall 110 may begin with pre-bending both ends 230 of the sheet 200 to the desired cylinder curvature, producing intermediary sheet 220. This pre-bending operation may prevent formation of a flat spot in the region of the end weld 214 (FIG. 5C) to ensure a finished full cylindrical shape of the cylindrical basket wall 110.

A typical 3-roller sheet bending machine 300 is shown schematically in FIG. 6. The 3-roller sheet bending machine 300 mainly comprises the following parts: 3 rollers (upper roller 310 and 2 bottom anvil rollers 320 and 330, which are driven), motors, gears, power screw, and frame. The motors, gears, power screw, and frame are omitted from FIG. 6 for purposes of clarity. The 2 bottom anvil rollers 320 and 330 may act as a fixed support for holding the intermediary sheet 220 and may be driven in tandem at low speed, typically using a geared motor, to move the continuous sheet 220 forward.

Bottom anvil rollers 320 and 330 are coupled to the 3-roller sheet bending machine 300 in a manner that allows for variable spacing between the bottom anvil rollers 320 and 330. When bottom rollers 320 and 330 are coupled to simultaneously drive the intermediary sheet 220 in an anti-clockwise direction, then the passive upper roller 350 rotates in a clockwise direction Bending of the intermediary sheet 220 may be done by applying a controlled force 350 to the movable upper roller 310 in a downward direction toward the bottom anvil rollers 320, 330. This controlled force 350 acting on the intermediary sheet 220 through upper roller 310 may cause plastic deformation of the entering intermediary sheet 220 material so that a continuously curved sheet 360 emerges from the 3-roller sheet bending machine 300 with the desired radius of the cylindrical basket wall 110.

There are several methods of fabricating the finished cylindrical centrifuge basket 100 having perforations in the cylindrical basket wall 110. In a first fabrication method, since it is easier to roll a flat, unperforated sheet 200 into a continuous curve, the drilling of holes for the perforations can be done after the cylindrical basket wall 110 is fully formed and welded to the reinforcing ring 120 and the disk-shaped baseplate 130. In this method, the solid unperforated sheet is rolled and welded to produce a cylinder, attached to the reinforcing ring 120 and disk-shaped baseplate 130, and then perforated to form the perforation holes 112 in the cylindrical basket wall 110. The perforation holes may be radially drilled or end-milled on a 4-axis horizontal boring mill (3-axis horizontal boring machine plus a rotating table as a $4^{th}$ axis). Alternatively, the perforation holes 112 may be water jet or laser cut.

In a second fabrication method, the sheet 200 for forming the cylindrical basket wall 110 can be pre-perforated while flat, prior to rolling the sheet 200 into the cylindrical basket wall 110. Hole-forming is much easier and faster on the flat sheet 200 compared to forming holes in a cylinder and may allow for production of a variety of hole shapes, such as polygonal or other non-round shapes, through water jet or laser cutting, die punching, or broaching.

Figure 6A:
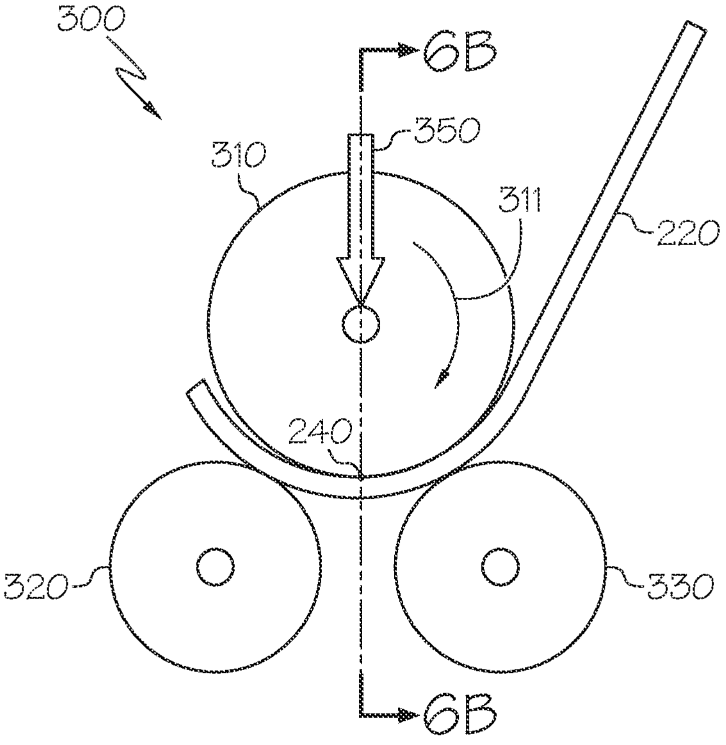
FIG. 6A schematically depicts operation of a 3-roller sheet bending machine for rolling a cylinder from a metal sheet, according to one or more embodiments shown and described herein.
Figure 7A:
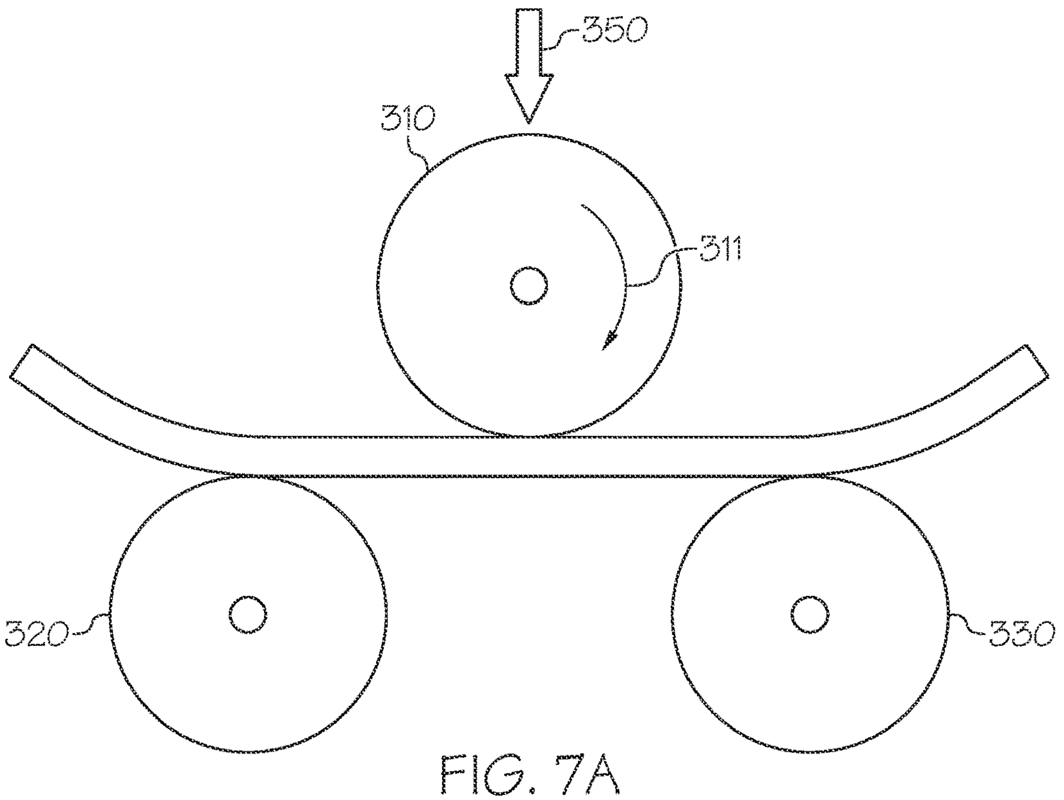
FIGS. 7A, 7B, 7C, and 7D schematically depict process steps in rolling a cylinder from a metal sheet with a 3-roller sheet bending machine, according to one or more embodiments shown and described herein.
Figure 7B:
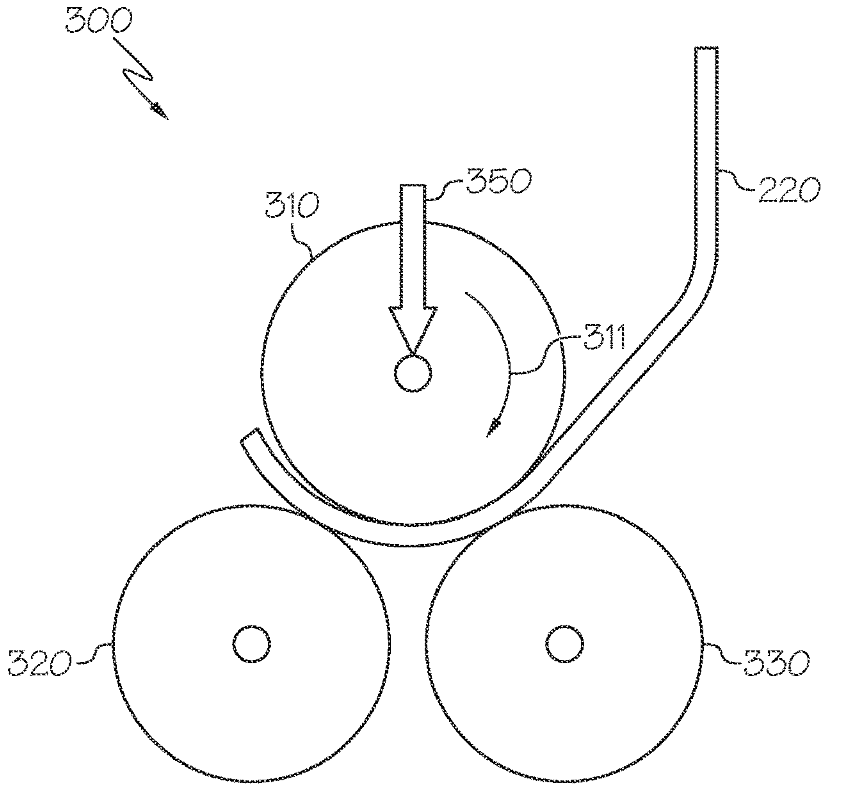
Figure 7C:
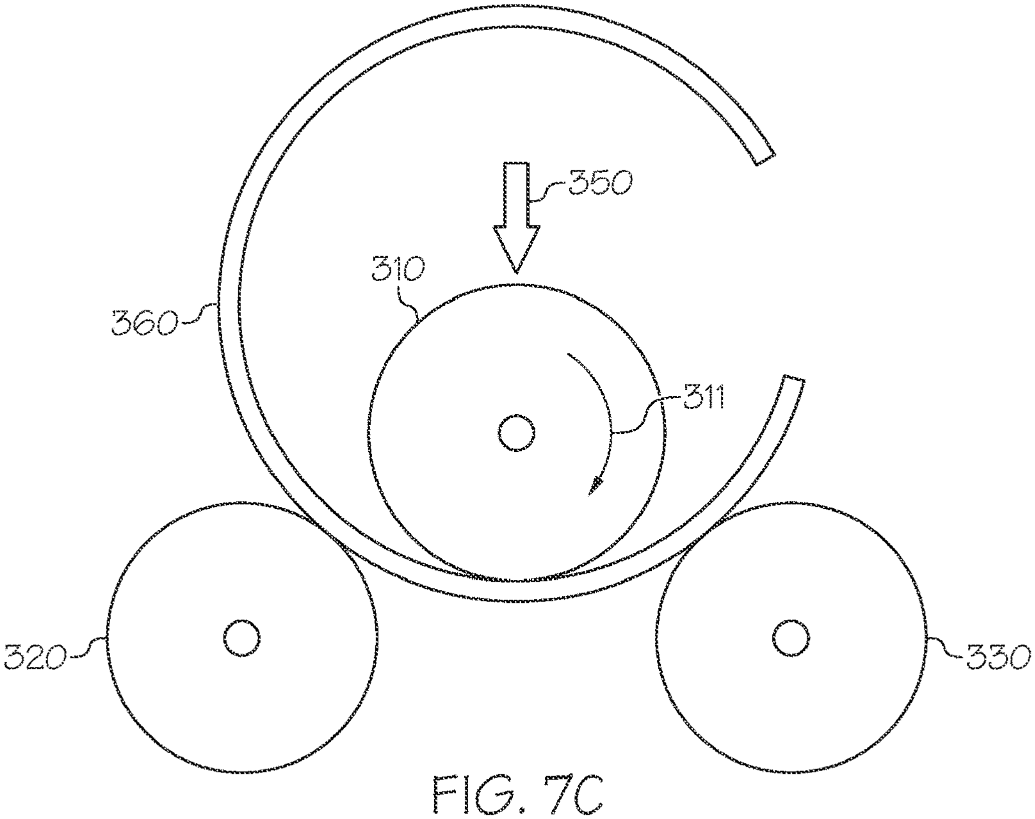
Figure 7D:
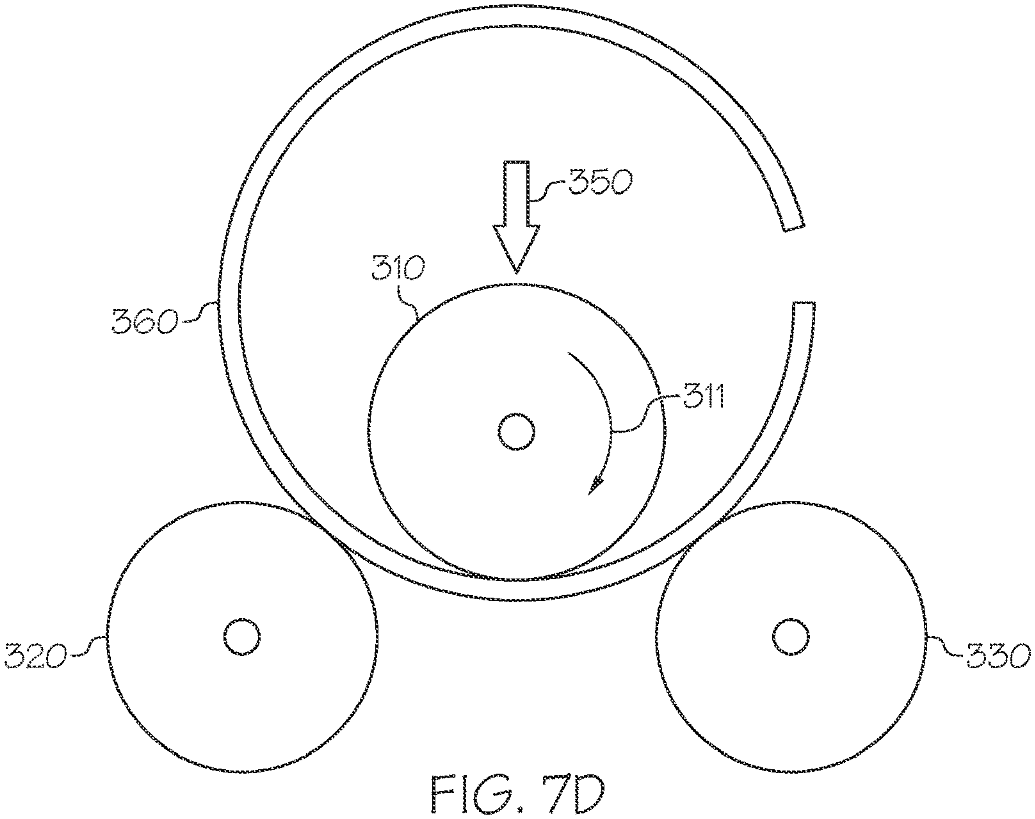

However, in the second fabrication method, the pre-perforation of the sheet 200 before roll forming the sheet 200 into the cylindrical basket wall 110 may create problems in the sheet rolling process of FIG. 6A. This is a special problem for rolling centrifuge baskets with repeating rectilinear pre-perforation lines extending across the length of the sheet 140, as shown in FIG. 7A. When pre-perforated, the perforation hole lines on the intermediary sheet 220 may run exactly parallel to the rotational axes of top roller 310 and bottom anvil rollers 320 and 330 of the 3-roller sheet bending machine 300.

Figure 6B:
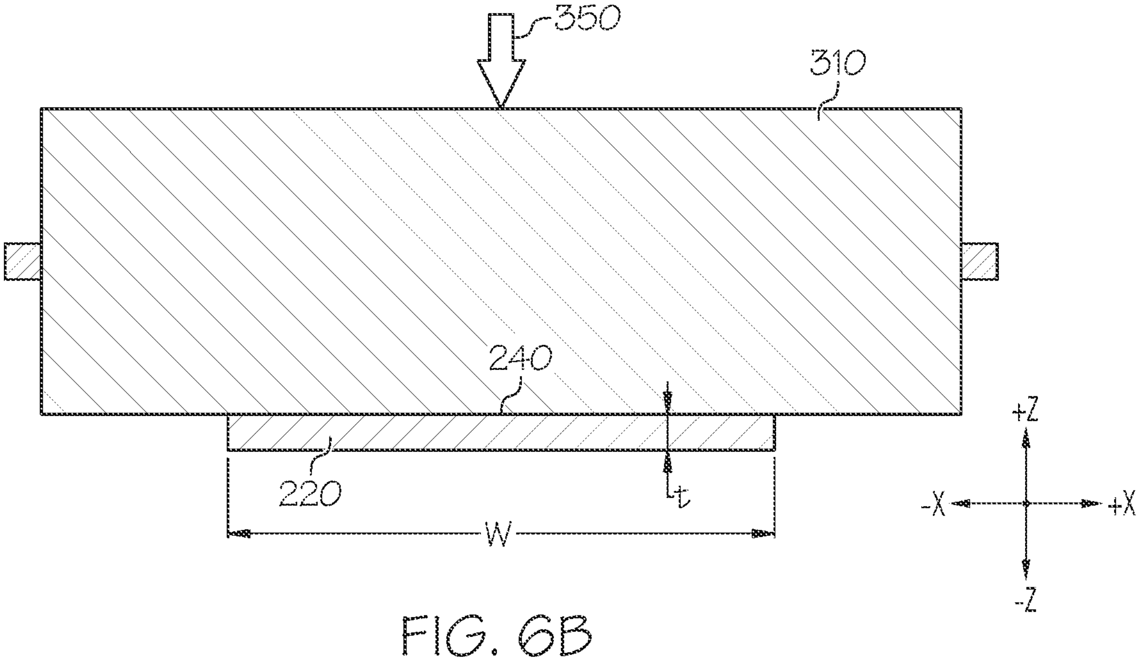
FIG. 6B schematically depicts a front cross-sectional view of the 3-roller sheet bending machine for rolling a cylinder from a metal sheet taken along reference line 6B-6B in FIG. 6A, according to one or more embodiments shown and described herein.

When any sheet 200 or intermediary sheet 220 of constant thickness t and width W is passed through the 3-roller sheet bending machine, there is a bending stress S proportional to the rolling force F (ref. 350 in FIG. 6A) that is applied at the contact line 240. Referring now to FIG. 6B, the contact line 240 is a line parallel with the width direction W of the sheet at which the top roller 310 contacts the sheet 200 or intermediately sheet 220. The bending stress S is inversely proportional to the XZ cross-sectional area $A_{XZ}$ of the sheet 200 or intermediary sheet 220 along the contact line 240. The bending stress S can be expressed by the relationship $S=F/A_{XZ}$. For a solid sheet, this XZ cross-sectional area $A_{XZ}$ is expressed mathematically by the product of the thickness t and the sheet width W. Thus, the cross-sectional area is $A_{XZ}=t\times W$.

In the case of a line of perforations across the width W of the sheet 200, the cross-sectional area $A_{XZ}$ is reduced by the material removed where the perforation holes 112 are, and thus the sheet 200 is weakened. As the XZ cross-sectional area $A_{XZ}$ decreases, the bending stress S resulting from constant force F will increase. Along the centerline of the perforation holes 112, each hole reduces the XZ cross-sectional area $A_{XZ}$ by an amount equal to t×D, where D is the diameter of the holes. In the case of a number (M) of holes of diameter (D) along that centerline, the centerline XZ cross-sectional area $A_{XZ}$ can be expressed by the following Equation 1 (Eqn. [1]).

$$A_{XZ}=tW-M(tD)=t(W-MD) \qquad \text{Eqn. [1]}$$

If the perforated sheet is significantly weakened and the bending stress S is elevated, this may cause the perforated sheet to start to fold or buckle along the along the weakened portion of the perforated sheet. Thus, the propensity of the sheet 200 to fold or buckle along a line parallel to the width W of the sheet 200 during roller forming may be proportional to the amount of material removed alone that line to create the perforation holes 112.

The propensity of regions of the sheet 200 for experiencing folding or buckling during roller forming may be modeled by dividing the sheet 200 into a series of narrow bands, each of which extends across the sheet width W so that each of the bands has a width equal to the sheet width W. Each successive band along the Y direction integrates the effect of the XZ cross-sectional area removed over a short length, such as a band having a length ΔY=D, where D is the hole diameter of the perforation holes 112. For a sheet 200 of constant unit thickness t, the total area represented by each band before forming perforations is ΔY×W=D×W. The amount that the sheet 200 has been weakened by forming the perforation holes 112 in the sheet 200 can be approximated by the % Material Remaining, which is the total area of the band (ΔY×W or D×W) minus the area of material removed after forming the perforation holes (M×D), which is denoted by the lost metal area B (where B=M×W). The % Material Remaining (% MR) can be determined by the following Equation 2 (Eqn. [2]).

$$\% \ MR = 100\frac{(DW - B)}{DW} = 100\left[1 - \frac{B}{DW}\right] \quad \text{Eqn. [2]}$$

If there are significant and cyclic differences in % MR between the bands along the sheet 200, then the sheet 200 entering the gap formed by rollers 310, 320 and 330 may tend to buckle and fold rather than to deform into a smooth continuous curve. The greater the cyclic variability in the % MR, the greater the probability that the sheet 200 will buckle and/or fold in the bands having lesser % MR. The result of the rolling process may be a rolled sheet having a cross-sectional shape that is faceted like a scalloped polygon with folds at the hole lines between the scalloped curved sections, rather than a smoothly curved cylinder having a circular cross-sectional shape.

Once assembled, the cylindrical centrifuge basket 100 with the perforation holes 112 then must be dynamically balanced. Faceting or scalloping can make the cylindrical centrifuge basket 100 much harder to dynamically balance. In addition, the high G-forces during centrifugation may cause biomass material to collect in the interior facet corners of the cylindrical basket wall 110, which can create or further exacerbate any dynamic balancing issues.

Figure 8A:
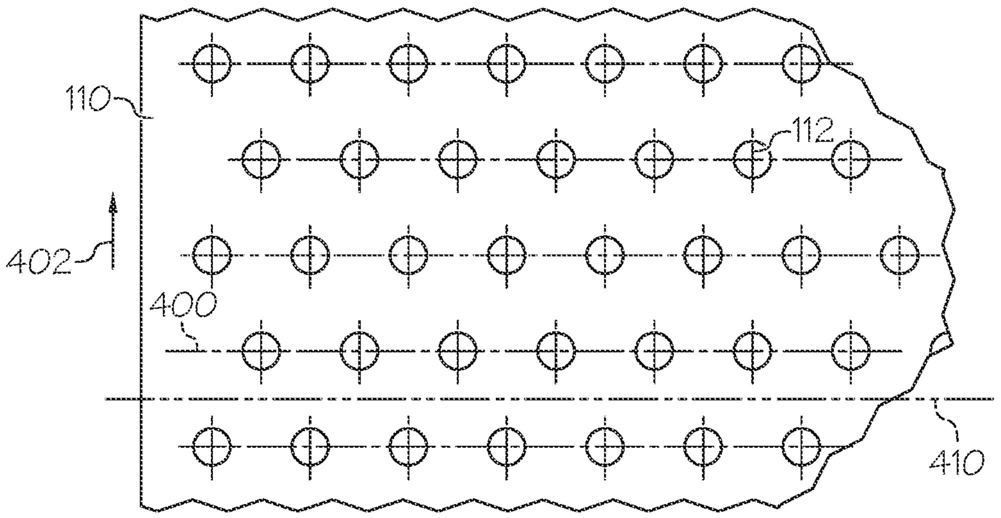
FIG. 8A schematically depicts a standard method of construction of the cylindrical centrifuge basket with a hole pattern on the basket surface parallel to a rotational axis of the cylindrical centrifuge basket, according to one or more embodiments shown and described herein.

Referring now to FIG. 8A, consider constant length AY bands across the cylindrical basket wall 110, where AY is equal to the hole diameter D of the perforation holes 112, sequentially along the sheet. In FIG. 8A, the perforation holes 112 are arranged in rows having a perforation hole line 400 that is parallel to the axis of rotation of the cylindrical centrifuge basket 100. A band centered at perforation hole line 400 weakened through the line of perforation holes 112 will have less folding resistance than a band centered at line 410 extending through solid material with no perforation holes 112.

Figure 8B:
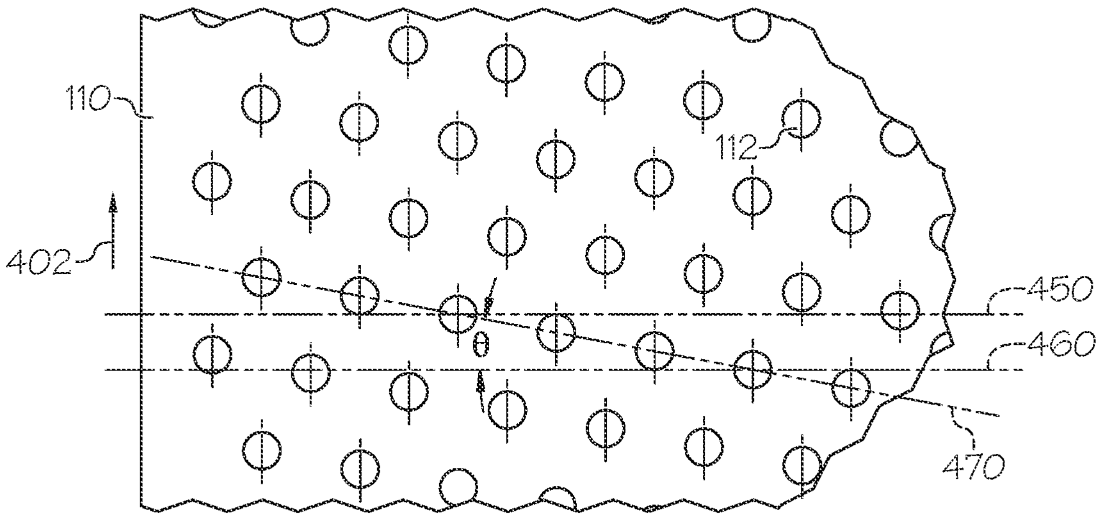
FIG. 8B schematically depicts a method of construction of the basket in which the hole pattern is along a line on the surface of the basket which is axially skewed at a non-zero skew angle relative to a line parallel to the rotational axis on the basket surface, according to one or more embodiments shown and described herein.

Rolling a flat sheet 200 with more uniformly distributed holes over the sheet 200 can reduce the tendency of the sheet 200 to fold or buckle, as the material strength is more consistent between bands. Referring now to FIG. 8B, for the cylindrical basket wall 110 depicted in FIG. 8B, the perforation hole lines 470 are equally spaced around the cylinder surface as are the perforation hole lines 400 in FIG. 8A. However, in the design shown in FIG. 8B, the perforation hole line 470 is angled so that the perforation hole line 470 forms a non-zero skew angle θ (Greek letter theta) with a line 460 that is parallel to the axis of rotation of the cylindrical centrifuge basket and parallel to the width W of the sheet 200. The skew angle Θ may be greater than or equal to 2, greater than or equal to 3, or greater than or equal to 4. The skew angle Θ may be less than or equal to 12, less than or equal to 10, or less than or equal to 8. In embodiments, the skew angle Θ may be in a range of from 2° to 12°, from 3° to 10°, or from 4° to 8°.

Forming the cylindrical basket wall 110 from a pre-perforated sheet 200 in which the perforation hole lines for a non-zero skew angle Θ with a line on the surface parallel to the axis of rotation of the cylindrical basket wall 110 may produce the cylindrical basket wall 110 and cylindrical centrifuge basket 100 having a circular cross-sectional shape that is not faceted or polygonal. In embodiments, no portion of an inner surface 114 of the cylindrical basket wall 110 and/or the cylindrical centrifuge basket 100 is flat. In embodiments, no portion of an inner surface 114 of the cylindrical basket wall 110 and/or the cylindrical centrifuge basket 100 made therefrom has a radius of curvature that differs by more than 2% from the mean radius of curvature relative to the cylindrical axis of the cylindrical basket wall 110.

Figure 9C:
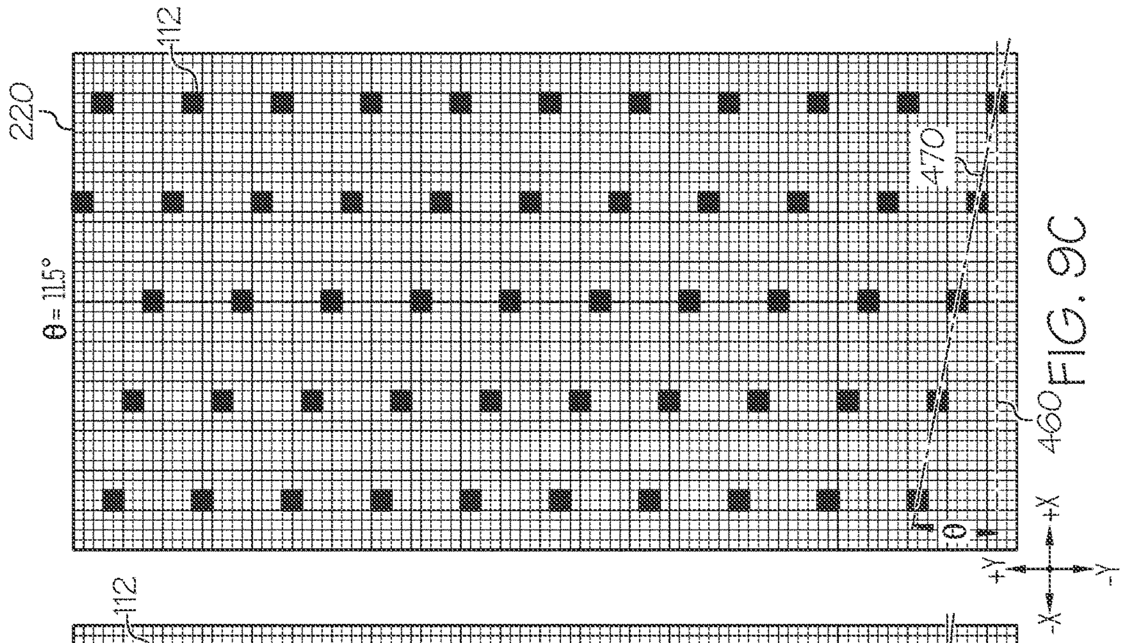
FIG. 9C schematically depicts an exemplary model of a pre-perforated sheet having a square hole pattern, where each row of perforations is along a line on the surface which forms a second non-zero skew angle relative to a line parallel to the rotational axis of the cylindrical centrifuge basket (horizontal line in FIG. 9C), according to one or more embodiments shown and described herein.
Figure 9B:
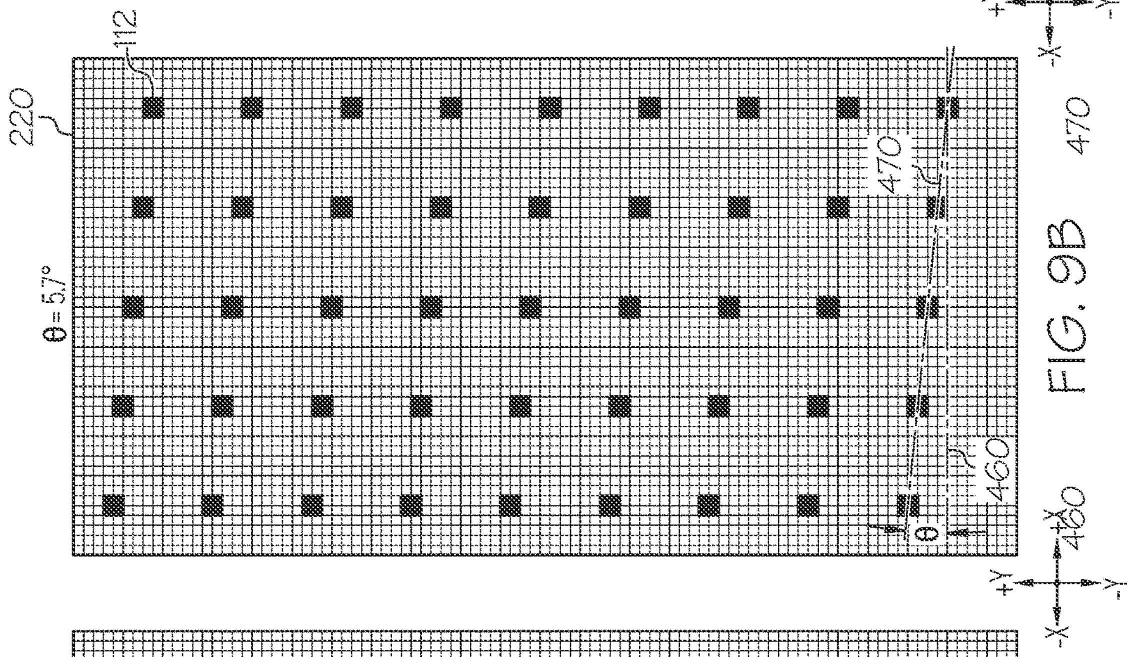
FIG. 9B schematically depicts an exemplary model of a pre-perforated sheet having a square hole pattern, where each row of perforations is along a line on the surface which forms a first non-zero skew angle relative to a line parallel to the rotational axis of the cylindrical centrifuge basket (horizontal line in FIG. 9B), according to one or more embodiments shown and described herein.
Figure 9A:
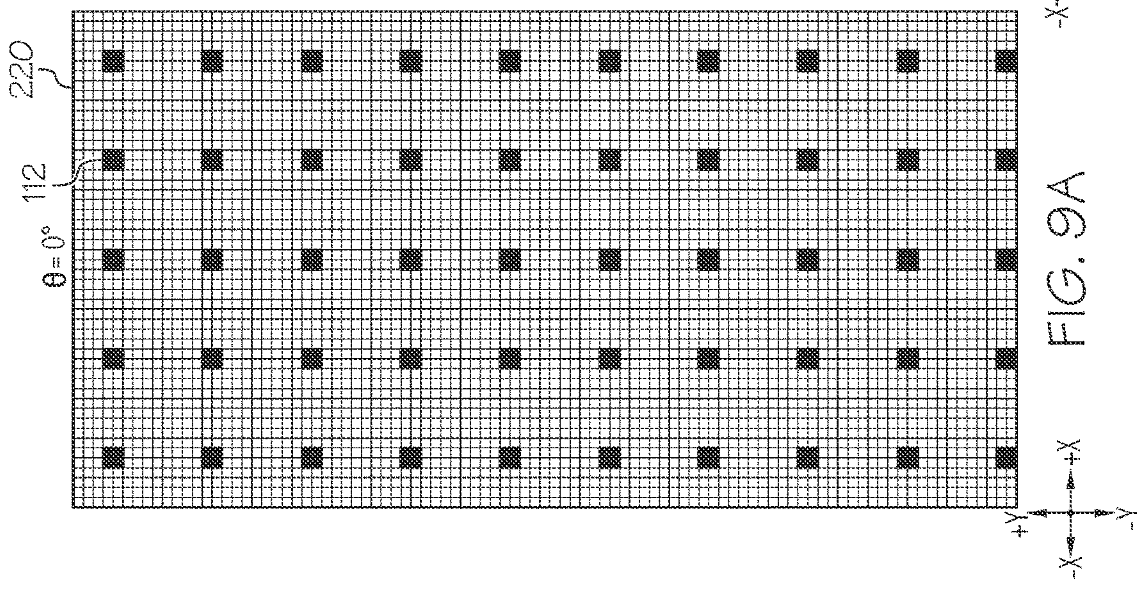
FIG. 9A schematically depicts a model of a pre-perforated sheet having a square hole pattern, where each row of perforations is along a line parallel to the rotation axis of the cylindrical centrifuge basket (horizontal line in FIG. 9A), according to one or more embodiments shown and described herein.

Applying the same banding model above, with a skewed perforation hole line 470, the band strength of the bands will vary along the sheet depending on what percentage of each band comprises partial and/or complete perforation holes 112. Since the impact of the skew angle Θ of the perforation hole line 470 on the band strength is not obvious, a simple qualitative exemplary model was made using a square grid and is shown in FIGS. 9A to 9C to demonstrate the impact of just the skew angle Θ of the perforation hole line 470. The square grid in this case was prepared using Microsoft Excel. Note that results in practice may depend on the material chosen, hole pattern and spacing, hole size, and hole shape among other variables.

In the exemplary model of FIGS. 9A-9C, assume 3 sheets 200 for forming the cylindrical basket wall 110, each sheet being 50 s wide, where s is the height and width of each square in the square grid. Each sheet 200 has rows of 5 square perforation holes 112, each having a length and width equal to 2 s. The rows are spaced apart so that the square perforations are 10 s center-to-center equidistant in both the X direction across and Y direction along the surface of the sheet 200.

FIG. 9A shows a model of a section of a sheet 200 where the line of perforation holes 112 is parallel to the rotational axis of the cylindrical centrifuge basket 100 made therefrom and/or parallel to the X axis in FIG. 9A, i.e., the model is rectilinear with no skew angle, so that Θ=0°. FIG. 9B shows a section of a sheet 200 in which the perforation hole line 470 has a skew angle of Θ=5.7° with the line 460 parallel to the X axis in FIG. 9B. FIG. 9C shows a section of a sheet 200 in which the perforation hole line 470 has a skew angle of Θ=11.5° with the line 460 parallel to the X axis in FIG. 9C.

For each of the three models of FIGS. 9A-9C, data for the number of holes in each band, the lost material in each band, and the % MR for each band are presented in Table 1 below. Data from eleven 2 s bands starting at the bottom of each FIGS. 9A, 9B, and 9C are presented. Note the repeat distance for each perforation hole line in this model is 5 bands, or 10 s, so two complete hole pattern cycles are shown in Table 1. For each skew angle Θ, the number of square holes in that band are shown, noting that partial holes may be present in the case of skewed hole lines. The lost metal area B of all the 4 $s^2$ holes is calculated. In each band, the % Material Remaining (% MR) is calculated using Eqn. [2] with DW=2 s×50 s=100 $s^2$.

TABLE 1

| %Material Remaining in each of band in FIGS. 9a, 8b, and 9c | | | | | | | | | |
|---|---|---|---|---|---|---|---|---|---|
| | FIG. 9a-Skew Angle 0° | | | FIG. 9b-Skew Angle 5.7° | | | FIG. 9c-Skew Angle 11.5° | | |
| Band | Holes | Lost, B | % MR | Holes | Lost, B | % MR | Holes | Lost, B | % MR |
| 1 | 5.0 | 20.0 | 80.0% | 1.5 | 6.0 | 94.0% | 1.0 | 4.0 | 96.0% |
| 2 | 0.0 | 0.0 | 100.0% | 2.0 | 8.0 | 92.0% | 1.0 | 4.0 | 96.0% |
| 3 | 0.0 | 0.0 | 100.0% | 1.5 | 6.0 | 94.0% | 1.0 | 4.0 | 96.0% |
| 4 | 0.0 | 0.0 | 100.0% | 0.0 | 0.0 | 100.0% | 1.0 | 4.0 | 96.0% |
| 5 | 0.0 | 0.0 | 100.0% | 0.0 | 0.0 | 100.0% | 1.0 | 4.0 | 96.0% |
| 6 | 5.0 | 20.0 | 80.0% | 1.5 | 6.0 | 94.0% | 1.0 | 4.0 | 96.0% |
| 7 | 0.0 | 0.0 | 100.0% | 2.0 | 8.0 | 92.0% | 1.0 | 4.0 | 96.0% |
| 8 | 0.0 | 0.0 | 100.0% | 1.5 | 6.0 | 94.0% | 1.0 | 4.0 | 96.0% |
| 9 | 0.0 | 0.0 | 100.0% | 0.0 | 0.0 | 100.0% | 1.0 | 4.0 | 96.0% |
| 10 | 0.0 | 0.0 | 100.0% | 0.0 | 0.0 | 100.0% | 1.0 | 4.0 | 96.0% |
| 11 | 5.0 | 20.0 | 80.0% | 1.5 | 6.0 | 94.0% | 1.0 | 4.0 | 96.0% |

Figure 10:
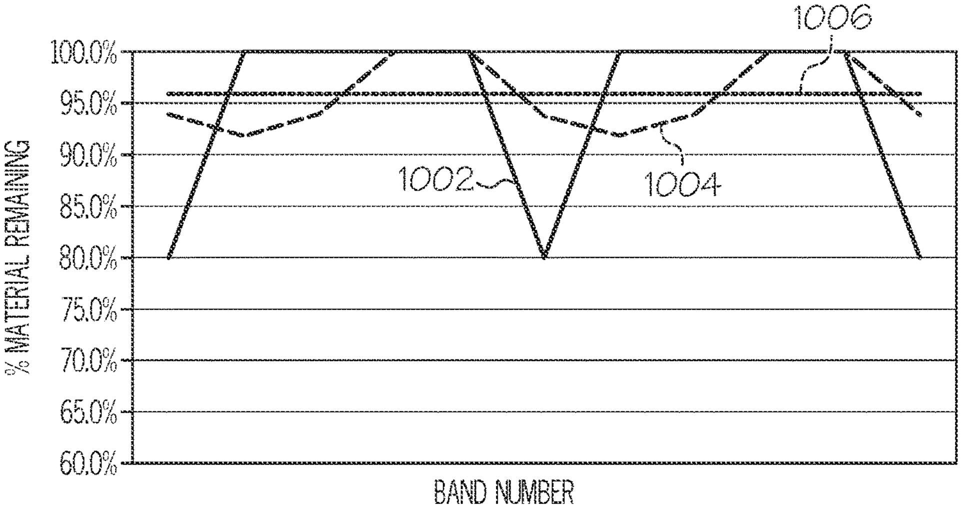
FIG. 10 graphically depicts the impact of skew angle on % Metal Remaining across the cylindrical basket wall for the exemplary models of FIGS. 9A, 9B, and 9C, according to one or more embodiments shown and described herein.

The relative band strength in each band is presented in the graph in FIG. 10 as the % Material Remaining (% MR) as a function of band number, for each of 3 skew angles and the 11 bands comprising cycles. Note that for the unskewed rectilinear model of FIG. 8A (reference no. 1002 in FIG. 10), the % MR for the unskewed hole line drops 20% (from 100% to 80%) in each band containing the hole line, showing a cyclic weakness which can lead to faceting during roll forming.

In FIG. 10, there is less cyclic material strength variation when using the skewed line of FIG. 9B (reference no. 1004 in FIG. 10) and the skewed line of FIG. 9C (reference no. 1006 in FIG. 10). The % MR line for skew angle Θ=5.7° shown in FIG. 10 (ref. no. 1004) varies by a maximum variation of 8% from a % MR of 92% to 100% in a cyclic manner. However, at skew angle Θ=11.5° skew, it may be seen in FIG. 9*c* that exactly 1 hole is in each band at all times and the % MR remains constant at 96% in each band as shown by the line corresponding to reference number 1006 in FIG. 10. From the model data in FIG. 10 and Table 1 above, the perforation hole pattern from FIG. 9C having a skew angle of 11.5° may provide the lowest probability of experiencing folding or buckling during cylinder roll forming compared to the perforation hole patterns in FIGS. 9A and 9B.

In looking at Table 1, the characteristics of the Lost Metal Area B data column for each skew angle Θ vary substantially. Note that a total of 40 $s^2$ hole area are lost in every cycle of 10 bands in each of FIGS. 9A, 9B, and 9C. However, the area lost, B, in each band varies substantially as a function of skew angle Θ.

The standard statistical measure of variance of the band sample lost metal area B can be calculated over one 10 band cycle here using function VAR.P in Microsoft Excel on the bands 1-10 data in Table 1. Variance (B, Θ) is used to illustrate the differences from band to band in lost area B at different skew angles Θ and is summarized in Table 2:

TABLE 2

| Mean and Variance of Lost Area B as a function of Skew Angle Θ | | |
|---|---|---|
| Skew, Θ | Mean B | Variance(B,Θ) |
| 0° | 5.45 | 79.34 |
| 5.7° | 4.18 | 10.51 |
| 11.5° | 4.00 | 0.00 |

When the perforation hole lines are parallel to the X direction at Θ=0° skew, as in FIG. 9A, Table 2 shows that the lost metal area B varies dramatically from 0.0 to 20.0 per band as the perforation hole lines are only every 5 bands, with solid metal in the bands between, so Variance (B, 0°) is 79.34. At a skew angle of Θ=5.7°, the Variance (B, 5.7°) is dramatically reduced to 10.51. At the skew angle of at Θ=11.5° for this geometric configuration, it can be seen that there is exactly 1 hole in each band, and the Variance (B, 11.5°)=0.0.

The above exemplary model is illustrates how skewing of the perforation hole lines can improve the rolling properties of a pre-perforated sheet for making the cylindrical basket wall 110, and that improvement in sheet uniformity caused by introducing a non-zero skew angle Θ can be quantitatively measured using the banding method and Variance (B, Θ).

Referring again to FIGS. 3 and 8B, in embodiments, the cylindrical centrifuge basket 100 of centrifuge 10 may have a 14 hole perforation hole pattern in which the perforation hole line 470 forms a skew angle of Θ=5.7° with line 460, which is parallel to the cylindrical axis or the X-axis of the sheet 200 used to produce the cylindrical centrifuge basket 100. The perforation hole line 470 may be the centerline of a 14-hole row sequence of laser cut perforation holes across the width W of the cylindrical centrifuge basket 100, with there being 96 rows of holes around the cylindrical centrifuge basket 100. Although depicted in FIGS. 3 and 8B as having 96 rows perforation holes, each row having 14 perforation holes 112, it is understood that the cylindrical centrifuge basket 100 of the centrifuge 10 may have a different number of rows of perforation holes 112 and/or a different number of perforation holes 112 per row.

For the cylindrical centrifuge basket 100 of FIG. 8B, Table 3 shows lost metal area B (in square inches) and Variance (B, Θ) data for skew angles Θ ranging for 0° to 10°, using bands equal to the hole diameter D=0.375 inches. Data is also presented for cylindrical centrifuge baskets 100 designed with skew angles of Θ=5.7° and Θ=6.77°. Other geometric considerations in the design of the cylindrical centrifuge basket 100 may influence the available choices for the skew angle Θ.

TABLE 3

Metal Loss B and Variance (B, ⊖) data for the Various Skew angles

| ⊖= | Skew 0° | Skew 1.5° | Skew 3° | Skew 5.7° | Skew 6.77° | Skew 10° |
|---|---|---|---|---|---|---|
| Mean B (sq in) | 0.676 | 0.678 | 0.677 | 0.678 | 0.677 | 0.677 |
| Variance(B,⊖) | 0.284 | 0.143 | 0.004 | 0.007 | 0.000 | 0.000 |
| as % Var(B,0°) | 100.0% | 50.3% | 1.6% | 2.4% | 0.0% | 0.0% |

Note that mean lost metal area B is constant over all bands in a cycle: Skewing the perforation hole 112 lines only redistributes the hole area over different bands in the cycle, which changes the Variance (B,Θ) data. Looking at Variance (B,Θ) data as a percentage of the rectilinear unskewed case Variance (B,0°) shows that even a small amount of skew (here 1.5°) can have a significant effect on the hole distribution uniformity of the perforated cylindrical centrifuge basket 100.

Figure 11:
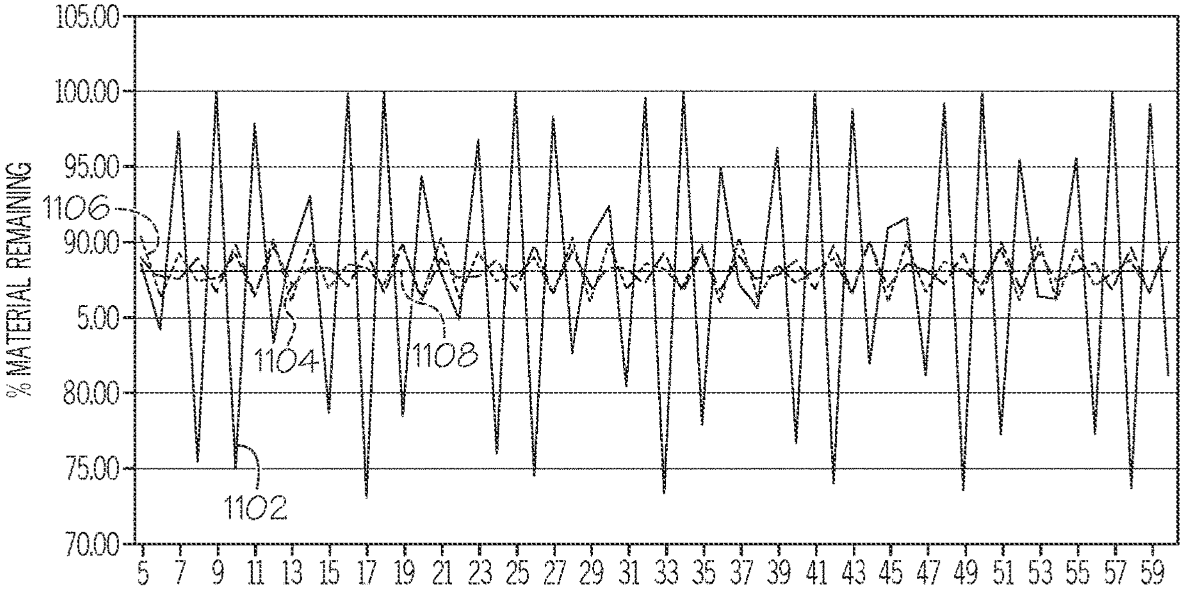
FIG. 11 graphically depicts the impact of the skew angle on % Metal Remaining across the cylindrical basket wall, according to one or more embodiments shown and described herein.

Referring now to FIG. 11, the % Metal Remaining (% MR) is displayed for skew angles Θ=0°, 3°, 5.7°, and 6.77°. The change in % MR for the unskewed case (Θ=0°) (reference no. 1102 in FIG. 11) can be as much as 27%. Highly perforated bands of 73% MR appear between solid areas where % MR=100%; thus there is significant weakening on the perforation hole lines 470. However, when skewed at a skew angle Θ=3° (reference no. 1104 in FIG. 11), the maximum change in % MR is reduced to 4%. The % MR for the 9=5.7° (reference no. 1106 in FIG. 11) is similar to the 9=3° case. And at skew angle Θ=6.77° (reference no. 1108 in FIG. 11), the % MR is a constant 81% for all bands.

A small range in % MR along the sheet 200 can greatly reduce the effect of the perforation holes 112 on the consistency of the cylinder formation in roll-forming a pre-perforated sheet 200 to produce the cylindrical basket wall 110. Production of a uniformly curved cylindrical basket wall 110 may enable easier dynamic balancing of the basket 100 and predictable centrifuge performance.

Skewing of the perforation hole line 470 for the perforation holes 112 of the cylindrical centrifuge basket 100 also may enable the pre-perforation of the flat sheet prior to formation of the cylindrical basket wall 110 through roll forming. Use of skewed perforation hole lines on a flat sheet 200 which is pre-perforated prior to cylinder rolling thus may improve the cost and time of manufacturing of cylindrical centrifuge baskets 100 compared to the conventional post-assembly perforating method.

Many modifications and other embodiments of the present disclosure set forth herein will come to mind to one skilled in the art to which this subject matter pertains, once having the benefit of the teachings in the foregoing descriptions and associated drawings. Therefore, it is understood that the subject matter of the present disclosure is not limited to the specific embodiments disclosed, and that modifications and other embodiments are intended to be included within the scope of the appended claims. Although specific terms are employed herein, they are used in a generic and descriptive sense only and not for purpose of limitation.

What is claimed is:

1. A method for manufacturing a cylindrical centrifuge basket, the method comprising:

perforating a metal sheet to form a perforated metal sheet having a plurality of perforations aligned along rows extending across a width of the a perforated metal sheet, wherein each row is skewed at a skew angle relative to a surface line on the perforated metal sheet, the surface line being parallel to an axis of rotation of the cylindrical centrifuge basket, wherein the skew angle is from 2° to 12°;

after perforating the metal sheet to form the perforated metal sheet, roller forming the perforated metal sheet into a cylindrical shape to produce a perforated basket wall;

coupling a first edge of the perforated basket wall to a second edge of the perforated basket wall to form a cylindrical basket wall; and forming the cylindrical centrifuge basket by coupling a first end of the cylindrical basket wall to a ring and coupling a second end of the cylindrical basket wall to a baseplate.

2. The method of claim 1, further comprising pre-bending the perforated metal sheet proximate the first edge and proximate to the second edge to a curvature of the cylindrical basket wall before roller forming the perforated metal sheet to produce the perforated basket wall sheet.

3. The method of claim 1, wherein the cylindrical basket wall has a circular cross section.

4. The method of claim 1 wherein a cross-section of the cylindrical basket wall is not faceted or polygonal.

5. The method of claim 1, wherein the metal sheet is a flat metal sheet and the perforated basket wall sheet is a curved perforated basket wall sheet.

6. The method of claim 1, wherein no portion of an inner surface of the cylindrical basket wall is flat.

7. The method of claim 1, wherein no portion of an inner surface of the cylindrical basket wall has a radius of curvature that differs by more than 2% from the mean radius of curvature from the cylindrical axis to the inner surface of the cylindrical basket wall.

8. A method of forming a cylindrical basket wall for a cylindrical centrifuge basket, the method comprising:

forming a plurality of perforations in a metal sheet having a longitudinal dimension Y, a first longitudinal end, a second longitudinal end, and a transverse dimension X to produce a perforated metal sheet, wherein:

the plurality of perforations are arranged in a plurality of rows spaced apart along the longitudinal dimension Y, each row forming a perforation hole line, and each perforation hole line forms a skew angle relative to the transverse dimension X of the metal sheet, wherein the skew angle is from 2° to 12°; and after forming the plurality of perforations, roller forming the perforated metal sheet into a cylindrical shape to form a perforated basket wall having a circular cross-sectional shape and a center axis wherein the center axis of the perforated basket wall is parallel to the transverse dimension X of the metal sheet;

coupling the first longitudinal end to the second longitudinal end to form the cylindrical basket wall; and forming the cylindrical centrifuge basket by coupling a first end of the cylindrical basket wall to a ring and coupling a second end of the cylindrical basket wall to a baseplate.

9. The method of claim 8, wherein the perforations in each row of perforations are evenly spaced apart from each other along the perforation hole line.

10. The method of claim 8, wherein the perforation hole lines of each of the rows of perforations are parallel with each other.

11. The method of claim 8, wherein the rows of perforation are arranged evenly around the cylindrical basket wall.

12. The method of claim 8, wherein the cylindrical basket wall has a circular cross section, or is not faceted or polygonal.

13. The method of claim 8, wherein no portion of an inner surface of the cylindrical basket wall is flat.

14. The method of claim 8, wherein no portion of an inner surface of the cylindrical basket wall has a radius of curvature that differs by more than 2% from the mean radius of curvature from the cylindrical axis to the inner surface of the cylindrical basket wall.

15. The method of claim 1, wherein the cylindrical centrifuge basket has from 20 to 300 of the rows of the plurality of perforations, and each of the rows has from 5 to 50 perforations.

16. The method of claim 1, wherein each of the plurality of perforations has a diameter of from 0.0625 inches to 1 inch.

17. The method of claim 1, wherein the skew angle is from 4° to 8°.

18. The method of claim 1, wherein:

the metal sheet is divided into a plurality of narrow bands having a width equal to the width (W) of the metal sheet and a length equal to a diameter (D) of the plurality of perforations; and a percent material remaining (% MR) in each of the plurality of narrow bands is greater than 80, where the % MR is calculated from Equation 2:

$$\%\ MR = 100 \times \left[1 - \frac{B}{(D \times W)}\right] \quad (2)$$

in which B is a product of the diameter (D) of each of the plurality of perforations times a number of the plurality of perforations in each of the plurality of narrow bands.

* * * * *